3,415,822
PRODUCTION OF CYANURIC ACID
Dale E. Elliott, Chester, George A. Elliott, Petersburg, and William P. Moore, Chester, Va., assignors to Allied Chemical Corporation, New York, N.Y., a corporation of New York
No Drawing. Filed Nov. 9, 1965, Ser. No. 507,061
4 Claims. (Cl. 260—248)

ABSTRACT OF THE DISCLOSURE

In an improved process for producing cyanuric acid and a gaseous ammonia mixture containing volatilized urea, the improvement which comprises passing said ammonia gaseous mixture through a zone in which solid particles of cyanuric acid having a temperature range within 20° to 175° C. showers said ammonia gaseous mixture thereby condensing the volatilized urea on the surface of the cyanuric acid particles to purify the ammonia, the weight ratio of cyanuric acid particles to volatilized urea in the zone being at least about 10:1.

---

This invention relates to the production of cyanuric acid, and, more particularly, to an improved process for recovering urea volatilized during the production of cyanuric acid from urea or urea cyanurate.

During the past two decades, the production of cyanuric acid has undergone many significant improvements. In the earlier stages of the development of this art, cyanuric acid was prepared by heating urea at elevated temperatures in a closed vessel until the evolution of ammonia ceased. It was later found that improved yields and reaction rates could be attained by reacting urea with a compound such as thionyl chloride or by heating urea in the presence of ammonium chloride or zinc chloride. All of these earlier processes were accompanied by the formation of solid materials on the walls of the synthesis vessels causing severe operational difficulties. In addition, various intermediate products and by-products were often formed which consumed part of the available urea and which had to be separated from the cyanuric acid, thus adding significantly to the cost. It was later found that various organic solvents, such as hydrocarbon oils, phenols, glycols and other alcohols reduced the tendency of the cyanuric acid product to solidify on the walls of the reaction vessels. The use of such solvents, however, was also accompanied by various disadvantages, such as discoloration of the product, difficulty of separating the product from the solvents, noxious odors and elaborate and expensive reactors and recovery systems necessary to assure the maximum utilization of the costly solvents.

The process described in U.S. Patent 2,943,088 represents an improvement over the aforementioned processes in that organic solvents are unnecessary and caking of the product on the walls of the reaction vessel is substantially avoided. In accordance with this process, urea is heated at 240° to 360° C. in a rotating vessel so that it passes from a molten state through a viscous, plastic state to a hard, solid state comprising free flowing granules of cyanuric acid. The process of U.S. Patent 3,154,545, which is similar to that of U.S. Patent 2,943,088 in many respects, but which calls for the cyanuric acid to be synthesized from urea cyanurate, also does away with the need for organic solvents. These processes are, however, characterized by a problem common to all such processes involving synthesis of cyanuric acid from urea or urea cyanurate, that is the tendency for significant amounts of the urea to volatilize at the elevated temperatures employed. In order to make such processes economically attractive, it is necessary to have an efficient method for recovering and utilizing the volatilized urea. In addition, it is necessary for operational continuity to prevent the volatilized urea from condensing in the gas vent system.

Among the known methods of effecting recovery of volatilized urea are the "condensation" method and the "scrubbing" method. The "condensation" method comprises passing the vent gases through a jacketed pipe condenser to obtain a liquid condensation product consisting mainly of urea. Such a process would require a relatively large and expensive condenser to furnish sufficient surface to remove all of the volatilized urea from the large volume of vent gases. There would also be the possibility of plugging of the pipes of the condenser, since the vent gases contain solids, such as finely divided cyanuric acid or ammelide, which may react with the urea to form an insoluble coating. The "scrubbing" method involves scrubbing the vent gases with an aqueous urea solution which is recycled in the process. However, direct recycle of the aqueous urea solution to the reactor feed would result in considerable hydrolysis of the urea when the urea is heated in the presence of water and cyanuric acid. On the other hand, if the aqueous solution is evaporated to dryness prior to recycle, additional costly processing steps are involved.

In view of the foregoing, it is an object of the present invention to provide an improved process for recovering volatilized urea for use in a cyanuric acid synthesis system.

It is a further object of this invention to provide a method of recovering volatilized urea from a cyanuric acid synthesis system for direct recycle to said system.

This and other objects which will be obvious hereinafter, are achieved by a process wherein a gaseous mixture containing volatilized urea is passed in contact with solid particulate cyanuric acid at a temperature within the range from about 20° to 175° C. whereby the urea is caused to condense on the surface of the cyanuric acid particles.

The term "volatilized urea" used herein refers not only to that gas which condenses on the cyanuric acid as urea, per se, or urea cyanurate, but also to any isocyanic acid which is conceivably present in the gaseous mixture due to the decomposition of the urea and which might condense on the particulate cyanuric acid in its polymerized form as additional cyanuric acid.

While this invention is primarily concerned with the recovery of urea evolved during the synthesis of cyanuric acid, the gaseous mixture may be one which has evolved from a separate and distinct process in which such gaseous mixtures containing urea are evolved. For example, a cyanuric acid synthesis system could be set up adjacent to a melamine synthesis system employing gaseous urea in which case any urea exiting the melamine reactor could be treated with the solid particulate cyanuric acid and fed to the cyanuric acid synthesis system. Where the source of the urea-containing gaseous mixture is a cyanuric acid synthesis system it may be a system which employs an organic solvent or one which does not.

The passage of the gaseous mixture in contact with the solid, particulate cyanuric acid can be effected in a number of ways. Preferably, the gaseous mixture and cyanuric acid particles are introduced into a suitably cooled rotating drum having baffles or other means for showering the cyanuric acid particles through the gaseous mixture and designed or positioned so as to promote the passage of solid material therethrough after a given retention time. The cyanuric acid can also be showered down countercurrent to the rising gaseous mixture in a suitably cooled column. The gaseous mixture can also be passed through a fixed bed of cyanuric acid particles, but this is not adapted for a continuous process.

It has been found that complete condensation of the volatilized urea on the cyanuric acid is achieved at temperatures ranging from about room temperature up to about 175° C. A preferred operating temperature range is 90° to 175° C. This preferred range permits a vaporization of any ammonium carbamate formed and requires a minimum cooling of the cyanuric acid for complete recovery of the volatilized urea.

The particle size of the cyanuric acid in the cooler is not critical, but smaller particles give greater surface per unit weight for condensation. Particles ranging in size from 2 to 40 U.S. mesh can be used and particularly satisfactory results are obtained using 4 to 20 U.S. mesh, cyanuric acid.

The weight ratio of solid cyanuric acid to volatilized urea necessary to effect efficient recovery is at least about 10:1. However, it is well within the skill of the art to ascertain the most advantageous ratio depending upon (1) the size of the cyanuric acid particles; (2) the retention time in the condensation vessel; (3) the rate at which the cyanuric acid particles and urea are passing one another; and (4) the temperature at which the condensation is carried out.

The residence times of the materials in the condensation vessel are similarly dependent upon other factors. In the following examples it will be seen that excellent results were obtained with an average residence time of about 17 to 23 minutes for the cyanuric acid and about 5 seconds for the gas, using a rotary drum type of cooling vessel. However, it is within the skill of the art to increase or decrease the residence times depending on the relative amounts of urea and cyanuric acid, the temperature, the particle size, and the size of the condensing vehicle. The pressure used is not critical, but subatmospheric pressure is preferred, since it facilitates removal of the uncondensed gases from the cooler.

The solid effluent from the condensation vessel may be stored for later use, but is preferably recycled to the cyanuric acid synthesis system, which may or may not employ a solvent, for conversion of the condensed urea to additional cyanuric acid in a known manner.

In the following illustrative examples all temperatures are in degree centigrade and all parts are by weight.

EXAMPLE I

From a urea feed system there is fed 31.2 parts of pebbled (5 to 20 U.S. mesh) urea which assays 97.7% urea. This urea is mixed with 68.6 parts of ground recycle crude cyanuric acid (CA). The mixture of CA and urea is fed to a rotary heater, called the feed pebbler, operating at 140° C. with 20 minutes retention time. In this rotary heater, pebbles of urea are coated with the ground CA and the urea is adsorbed from the center of the particle to the shell forming urea cyanurate, as described more fully in copending application S.N. 383,351, now U.S. Patent No. 3,318,887.

The solid urea cyanurate flows to another rotary heater, called the CA reactor which operates at 230–300° C. and retention time of 0.5 hour. Here the urea cyanurate forms cyanuric acid and the reactor solids, averaging 4 to 20 U.S. mesh in size, and gases pass to a water cooled rotary cooler which is the condensation vessel. The rotary cooler is about 2 feet in diameter and about 5 feet long. It makes about 5 rotations per minute and provides an average residence time of about 17 to 23 minutes for the cyanuric acid while cooling it to 135° C. A blower on the vent line maintains the entire system at 2–6 inches of water below atmospheric pressure and provides a residence time of about 5 seconds for the gases. The vent gases from the cooler amount to 8.38 parts and are scrubbed for ammonia recovery. About 2.75 parts of urea (which is 9.1 weight percent of the urea fed to the process) is condensed on the showering cool crude cyanuric acid product. This is complete condensation of the volatilized urea.

Abut 91.42 parts of crude product is discharged from the cooler. The product is split and 68.6 parts are recycled to the feed pebbler. The remaining 22.82 parts are removed and sent to purification with the following composition.

| Component: | Weight percent |
| --- | --- |
| Cyanuric acid | 85.25 |
| Urea | 3.01 |
| Ammelide | 11.74 |
| Total | 100.00 |

This CA product may be purified if desired. The urea condensed in the cooler and recycled with the crude product to the feed pebbler represents about 6–7 weight percent of the feed urea. No urea passes to the vent system thus eliminating pluggage, and no additional recovery system is needed to make the urea available for recycle.

EXAMPLE II

In an alternate operation of the process of Example I, about 22 parts of crude cyanuric acid is split from the stream leaving the cyanuric acid reactor and is taken as product. The remaining crude cyanuric acid (about 67 parts) is fed to the cyanuric acid cooler where it is cooled to about 135° C. The cooled showering cyanuric acid in the cyanuric acid cooler is ample to remove all the urea from the gases going to the vent system. The advantage of this type of operation is that all of the urea condensed in the cooler may be recycled in the process, i.e., all the solids from the cyanuric acid cooler may be fed to the feed pebbler.

From the foregoing examples, it can be seen that a novel method has been devised for recovering volatilized urea without the use of aqueous solutions and with substantially no condensation of urea and cyanuric acid on the walls of the condensation vessel. The second of these advantages is achieved with particular success using a rotary drum type vessel, since the cyanuric acid pellets continuously hitting the inner wall of the vessel prevent any buildup of solid material thereon.

Furthermore, the vent gas stack is free from plugging and the ammonia may be scrubbed from the vent gas without contamination with urea.

It will be recognized that certain modifications can be made by those skilled in the art without departing from the scope of the present invention as defined by the appended claims. For example, various means of cooling the condensation vessel can be employed, such as a jacket containing a suitable coolant, a stream or spray of water or other means.

We claim:

1. In an improved process for producing cyanuric acid which comprises heating an agitated mixture of finely divided cyanuric acid and solid pellets of urea to a temperature no higher than 160° C. to produce hollow pellets of urea cyanurate, heating said urea cyanurate at a temperature in the range 230°–300° C. whereby cyanuric acid is produced and a gaseous ammonia mixture containing volatilized urea is evolved, the improvement which comprises:

passing said ammonia gaseous mixture through a zone in which solid particles of cyanuric acid having a temperature range within 20° to 175° C. showers said ammonia gaseous mixture thereby causing the volatilized urea on the surface of the cyanuric acid particles to purify the ammonia, the weight ratio of cyanuric acid particles to volatilized urea in the zone being at least about 10:1;

separating said particles of cyanuric acid containing the condensed urea from the residue of the ammonia gaseous mixture; and returning at least a portion of the particles for grinding and admixture with the urea pellets.

2. In an improved process, according to claim 1, wherein the cyanuric acid product produced by heating the urea cyanurate at 230°–300° C. is in part removed as product, and in part fed to a rotating drum containing the mixture of cyanuric acid and urea for condensation of the urea.

3. In an improved process for producing cyanuric acid which comprises heating urea, urea cyanurate or mixture thereof at 230°–300° C. to produce cyanuric acid and a gaseous ammonia mixture containing volatilized urea, the improvement which comprises:

passing said ammonia gaseous mixture through a zone in which solid particles of cyanuric acid having a temperature range within 20° to 175° C. showers said ammonia gaseous mixture, thereby condensing the volatilized urea on the surface of the cyanuric acid particles to purify the ammonia, the weight ratio of cyanuric acid particles to volatilized urea in the zone being at least about 10:1.

4. In an improved process according to claim 3, which further includes separating said particles containing condensed urea from the residue of the gaseous ammonia mixture; and subjecting said particles to sufficient heat to produce additional cyanuric acid.

References Cited

UNITED STATES PATENTS

| | | | |
|---|---|---|---|
| 3,154,545 | 10/1964 | Symes et al. | 260—248 |
| 3,318,887 | 5/1967 | Moore et al. | 260—248 |

HENRY R. JILES, *Primary Examiner.*

J. M. FORD, *Assistant Examiner.*